(12) United States Patent
Wouters-Wasiak et al.

(10) Patent No.: US 6,808,629 B2
(45) Date of Patent: Oct. 26, 2004

(54) METHOD FOR EFFLUENT PURIFICATION (75) Inventors: Katia Wouters-Wasiak, Thanville (FR); Olivier Huber, Lingolsheim (FR); Frédéric Dupont, Lingolsheim (FR); Daniel Demain, Souffelweyersheim (FR)

(73) Assignee: Degremont (FR)

( * ) Notice: Subject to any disclaimer, the term of this patent is extended or adjusted under 35 U.S.C. 154(b) by 0 days.

(21) Appl. No.: 10/381,668

(22) PCT Filed: Sep. 25, 2001

(86) PCT No.: PCT/FR01/02968
§ 371 (c)(1),
(2), (4) Date: Mar. 27, 2003

(87) PCT Pub. No.: WO02/26641
PCT Pub. Date: Apr. 4, 2002

(65) Prior Publication Data
US 2004/0040907 A1 Mar. 4, 2004

(30) Foreign Application Priority Data
Sep. 27, 2000 (FR) .............................. 00 12303

(51) Int. Cl.⁷ .................................................. C02F 3/30
(52) U.S. Cl. ........................ 210/605; 210/614; 210/623; 210/629; 210/631; 210/906
(58) Field of Search ................................ 210/605, 614, 210/621, 623, 629, 631, 903, 906

(56) References Cited

U.S. PATENT DOCUMENTS

| | | | | |
|---|---|---|---|---|
| 5,019,266 A | * | 5/1991 | Soeder et al. | 210/605 |
| 5,252,214 A | * | 10/1993 | Lorenz et al. | 210/605 |
| 5,266,200 A | * | 11/1993 | Reid | 210/605 |
| 5,304,308 A | * | 4/1994 | Tsumura et al. | 210/614 |
| 5,447,633 A | * | 9/1995 | Matsche et al. | 210/605 |
| 5,514,278 A | * | 5/1996 | Khudenko | 210/605 |
| 5,578,200 A | * | 11/1996 | Funakoshi et al. | 210/134 |
| 5,798,044 A | * | 8/1998 | Strohmeier et al. | 210/605 |
| 6,312,599 B1 | * | 11/2001 | Reid | 210/605 |

FOREIGN PATENT DOCUMENTS

| | | | |
|---|---|---|---|
| DE | 28 26 922 A | | 1/1980 |
| DE | 2826922 | * | 1/1980 |
| DE | 44 36 739 A | | 4/1996 |
| DE | 4436739 | * | 4/1996 |
| EP | 0 396 142 A | | 11/1990 |
| EP | 0396142 | * | 11/1990 |
| FR | 2 753 191 A | | 3/1998 |
| FR | 2753191 | * | 3/1998 |
| FR | 2 760 232 A | | 9/1998 |
| FR | 2760232 | * | 9/1998 |

OTHER PUBLICATIONS

European Search Report PCT/FR 01/02988, dated Nov. 27, 2001.

* cited by examiner

*Primary Examiner*—Fred G. Prince
(74) *Attorney, Agent, or Firm*—Connolly Bove Lodge & Hutz LLP (57) ABSTRACT

A process for purifying wastewater including the step:
  a) rating the tanks and the aeration means on the basis of the lowest pollution load, referred to as the low load, which corresponds to the plant load during dry weather;
  b) running the plant during dry weather, or at low load, according to the nitrogen treatment method in a tank with biological dephosphatation;
  c) running the plant during wet weather, or at high load, by performing the physicochemical phosphorus treatment technique and the nitrogen treatment technique in two tanks, and
  d) controlling the plant by detecting the load situation it is in (high load or low load) and to adapt the operating configuration of the tanks to the actual load situation.

14 Claims, 6 Drawing Sheets

METHOD FOR EFFLUENT PURIFICATION

FIELD OF THE INVENTION

The present invention relates to a process for purifying wastewater, this process being of the "biological activated-sludge" type and its subject being the simultaneous removal of the nitrogen-based pollution and of the phosphorus-based pollution irrespective of the variations in daily pollutant loads to be treated, these variations possibly being periodical.

BACKGROUND OF THE INVENTION

It is known that in wastewater treatment plants, variations in pollutant loads may arise especially:
- from a specific and cyclic pollutant activity connected to the purification network (for example the wine-making industry);
- from rainfall in conjunction with a purification network configuration that promotes the decantation of the materials in suspension in the pipework, during dry weather (low load) in this case, the increase in the flows of wastewater transported during wet weather (high load) results in cleaning of the pipework, reflected in a temporary increase (of about 24 to 48 hours) in the pollutant load received by the treatment plant;
- from the seasons (summer-winter).

A review of the current state of the art regarding the treatment of nitrogen-based pollution and also the treatment of phosphorus-based pollution by biological purification plants of the activated-sludge type will be given hereinbelow. Reference may also be made to the Mémento Technique de l'Eau [Technical Water Guide], 9th Edition, 1989, Volume 2, Chapter 24, edited by Degremont.

In this description, reference will be made to FIGS. 1 to 8b which diagrammatically represent embodiments of the processes according to this current state of the art.

1) Treatment of Nitrogen

It is known that, in its general principle, the biological treatment of nitrogen involves two steps:
- the first step, performed in an "aerobic" zone, constitutes the nitrification step during which the reduced forms of nitrogen (organic and mineral) are oxidized in the form of nitrates by means of autotrophic bacteria. During this step, the bacteria used must have available firstly a source of mineral carbon normally present in the effluent to be treated, in the form of carbonates, and secondly a source of oxygen supplied by mechanical aeration means;
- the second step, performed in an "anoxic" zone, constitutes the denitrification step during which the nitrates formed during the first step are reduced to nitrogen gas, which is released into the atmosphere. This step uses heterotrophic bacteria, which must have available firstly a source of organic carbon naturally present in the effluent to be treated, and secondly a source of oxygen consisting of the oxygen chemically bonded to the nitrogen of nitrates, thereby allowing these nitrates to be reduced to nitrogen gas.

At the present time, there are two techniques for carrying out the process mentioned above. These two techniques differ only as regards the second step, i.e. the use of the anoxic zone. The first of these techniques uses two treatment tanks (FIG. 1) and the second uses only one tank (FIGS. 2a and 2b).

a) Two-Tank Technique

Figure 1:
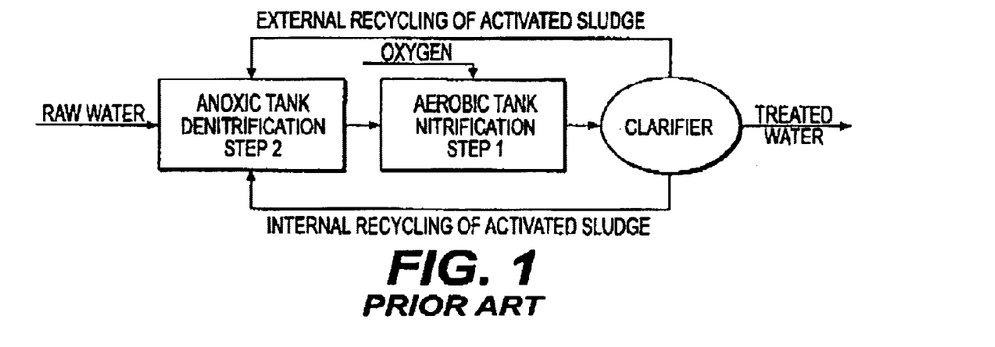
Figure 2A:
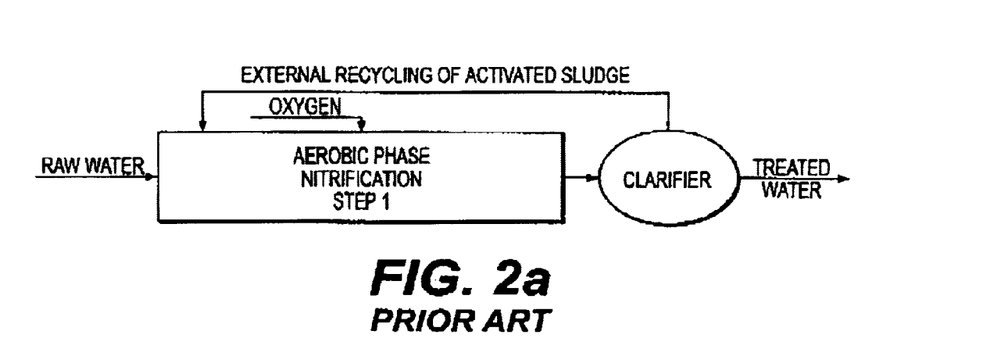
Figure 2B:
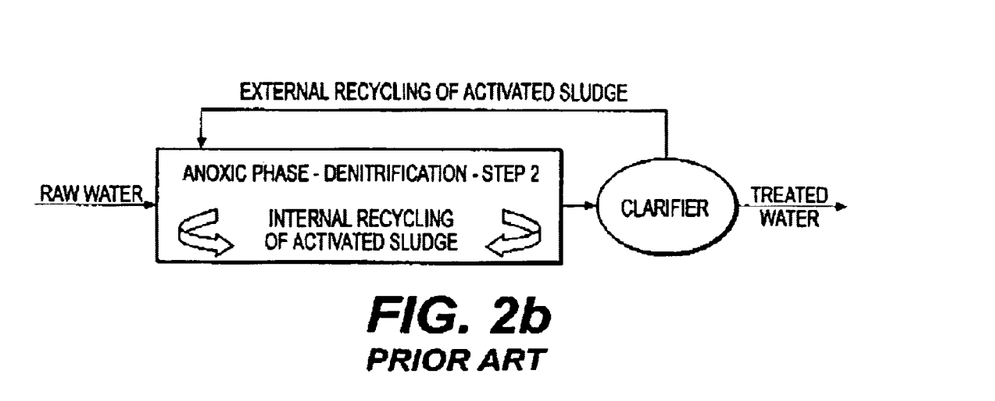

As seen in FIG. 1, each step of the treatment mentioned above is performed in a separate tank:
- an aerobic tank in which the first step (nitrification) is performed;
- an anoxic tank in which the second step (denitrification) is carried out.

FIG. 1 clearly shows the manner in which this known treatment is performed.

The raw water, i.e. the effluent to be treated, supplies the carbon required by the heterotrophic bacteria performing the denitrification in the anoxic tank, the mass of bacteria required, contained in the activated sludge, is supplied continuously by means of an internal recycling of the activated sludge from the aerobic tank to the anoxic tank.

The oxygen required for the aeration in the aerobic tank is provided by any mechanical aeration means (turbomixer, brushes, supercharger, etc.). The capacity of the aeration means ($QO_2$) is characterized by their hourly power expressed as kilograms of oxygen per hour ($kgO_2/h$). This hourly power is calculated according to the following principle:

$$QO_2 = \text{daily amount of oxygen/daily running time.}$$

The daily amount of oxygen is the amount required to treat all the carbon-based and nitrogen-based pollution, the daily running time of the aeration means generally being about 20 hours per day. With this treatment technique, the hourly aeration power is about $1/20$ of the daily amount of oxygen to be supplied.

b) One-Tank Technique

In this known technique, illustrated by FIGS. 2a and 2b, the two steps of nitrification and denitrification proceed in a single tank with alternation of the aerobic and anoxic phases. Thus, the same biological tank serves alternately as the aerobic tank and as the anoxic tank so as to perform all of the nitrogen treatment process.

FIG. 2a shows the operating mode of the single tank in the aerobic phase (first step—nitrification) and FIG. 2b shows the operating mode of this tank in the anoxic phase (second step—denitrification).

The raw water, i.e. the effluent to be treated, supplies the carbon required by the heterotrophic bacteria that perform the denitrification in the anoxic phase (second step).

The oxygen required for the aeration during running in the aerobic phase is supplied by any mechanical aeration means, as in the case of FIG. 1. The power of the aeration means ($QO_2$) is determined in the same way as indicated above in the case of the treatment in two tanks.

The daily running time of the aeration means incorporates the time required for the anoxic phases (no aeration), this being directly proportional to the amount of nitrogen to be treated. Consequently, the duration of the aeration over a 24-hour cycle is much shorter in the case of this one-tank technique compared with the two-tank technique, for the same pollutant load to be treated. In general, this aeration time is about 12 hours per day.

In this technique, the hourly aeration power is about $1/12$ of the daily amount of oxygen to be supplied.

A comparison of the costs of the two nitrogen treatment techniques reviewed above is summarized below.

In these two techniques, the total volume of the biological aeration tank (cumulative volume of the two aerobic and anoxic tanks in the first technique or total volume of the tank operating alternately according to the second technique) will be the same for an identical pollution load to be treated. The essential differences between the two techniques are the following:

the constructional arrangements of the biological stage including the two-tank configuration are more expensive than the one-tank configuration;

the power of the aeration means, which is about 70% higher in the one-tank technique than that required in the two-tank technique.

Since the two treatment techniques are of equivalent acknowledged efficacy, insofar as the rules of the art are complied with, the choice of one or other of these techniques is usually made on the basis of economic considerations. Specifically, it is commonly accepted that for small purification plants, the one-tank technique requires less investment than the two-tank technique. This advantage decreases as the treatment capacity increases, and is totally reversed in the range of large treatment units, the cost of the aeration systems then becoming predominant over the constraints imposed by the two-tank configuration.

2) Treatment of Phosphorus

In the current state of the art, the treatment of phosphorus is performed via two routes, a physicochemical route and a biological route, respectively.

a) Physicochemical Treatment Route

Figure 3:
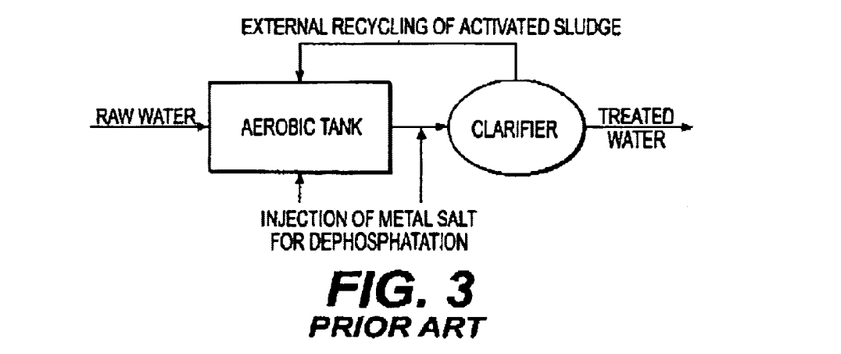

The implementation of this treatment is illustrated by FIG. 3. It consists in injecting a metal salt (for example $FeCl_3$) in an amount which is suitable for the required level of treatment, so as to precipitate the phosphorus to be removed in the form of a metal phosphate. As may be seen in FIG. 3, the reagent may be injected into several points of the biological system: into the aerobic tank or between the aerobic tank and the clarifier. In the two cases, the precipitated metal phosphate is extracted from the treatment course with the excess biological sludge.

The dephosphatation sludge consists of a mixture of metal phosphate and metal hydroxide, the metal ion necessarily being injected at doses higher than the stoichiometry, due to the competition of the various chemical reactions involved. The order of magnitude of the molar ratio: metal ion/ eliminated P (for example Fe/P) is between 1.1 and 1.8 depending on the removal efficiency required for the phosphorus.

The amount of metal salt to be injected is proportional to the amount of phosphorus to be precipitated, which is defined in the following manner:

$$P(pre)=P(ent)-P(assim)-P(disch)$$

where:

P(pre): amount of phosphorus to be precipitated,

P(ent): amount of phosphorus entering the treatment system,

P(assim): amount of phosphorus biologically assimilated for the metabolism of the microorganisms, P(disch): amount of phosphorus discharged by the treatment system, defined by the quality of discharge to be complied with.

In general, the removal efficiency corresponding to P(assim) is about 25%.

By way of example, the amount P(pre) required to comply with the level "PT1" which corresponds to a removal efficiency of 80% would be, for an amount P(ent)=100 kg/day P(pre)=100−25−20=55 kg/day.

The corresponding production of dephosphatation sludge would be 325 kg/day, in the case of the use of an iron salt with an Fe/P molar ratio of 1.3; the amount of iron salt used would be 129 kg expressed as iron.

b) Biological Treatment Route

Figure 4A:
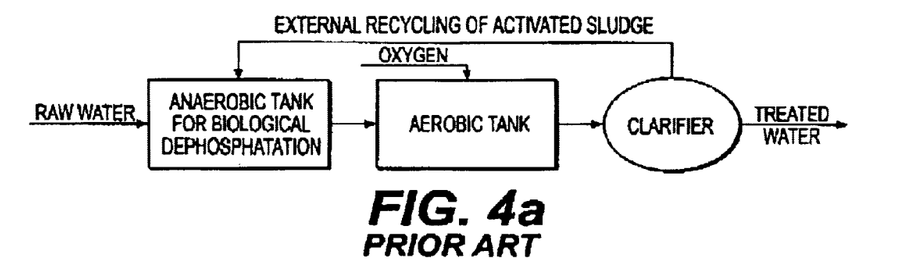

In this technique, illustrated by FIG. 4a, an over-assimilation of phosphorus by the microorganisms (bacteria) is performed in order for the amount P(assim) to be markedly higher than that in a standard biological treatment system. Without it being necessary to explain in detail the biological mechanisms involved in this treatment, it may be stated that the result is obtained by continually subjecting the bacteria to successive anaerobic and aerobic phases.

Figure 4B:
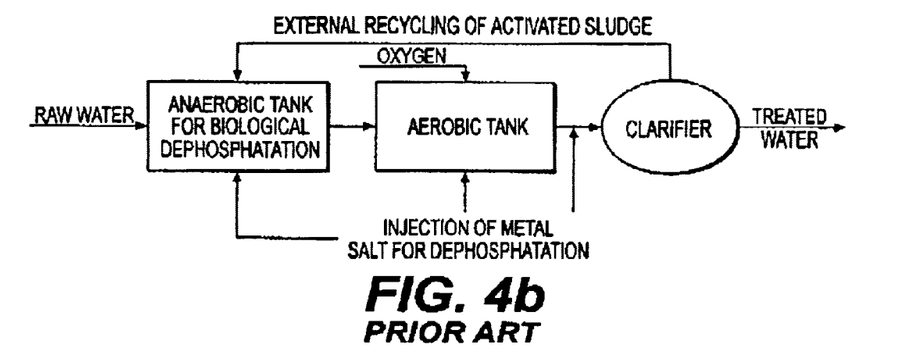

As is seen in FIGS. 4a and 4b, the treatment plant comprises in this case an anaerobic tank for the biological dephosphatation and an aerobic tank. The operating principle emerges clearly from examination of these figures.

The main conditions required to perform the phosphorus over-assimilation process are the following:

for the effluent to be treated:
high COD/P ratio
presence of readily assimilable soluble COD;

for the anaerobic tank:
absence of dissolved oxygen and of bound oxygen allowing the existence of a negative redox potential corresponding to true anaerobic conditions;
effluent residence time of between 2 and 3 hours.

When the conditions mentioned above are met, the removal efficiency corresponding to the amount P(assim) is generally about 55%. In most cases, this efficiency will be insufficient to obtain the required level of phosphorus discharge, and it is then necessary to complete the treatment by means of a physicochemical treatment involving an injection of metal salt to complete the dephosphatation. The operating principle is then that illustrated by the scheme in FIG. 4b.

As is seen in this figure, the dephosphatation reagent may be injected into several points of the biological system: into the anaerobic tank; into the aerobic tank; between the aerobic tank and the clarifier.

By way of example, the amount P(pre) that needs to be removed by precipitation in order to comply with a level PT1 that corresponds to a removal efficiency of 80% would be, for an amount P(ent)=100 kg/day:

(pre)=100−55−20=25 kg/day.

The corresponding production of dephosphatation sludge would be 178 kg/day, in the case of using an iron salt with an Fe/P molar ratio of 1.3; the amount of iron salt used would be 59 kg expressed as iron.

A comparison of the costs between these two phosphorus removal techniques shows that the essential differences concern the following points:

the constructional arrangements of the biological stage, of which the two-tank configuration for the biological dephosphatation technique is more expensive than the one-tank configuration for the physicochemical dephosphatation;

the consumption of metal salt, which will be higher in physicochemical dephosphatation than in biological dephosphatation (120% higher in the example under consideration);

the production of dephosphatation sludge, which will be higher in physicochemical dephosphatation than in biological dephosphatation (80% higher in the example presented).

Since these two treatment techniques are of equivalent acknowledged efficacy, insofar as the rules of the art are complied with, the choice of one or other of these techniques will be depend on:

the characteristics of the effluent to be treated, which may be more or less favourable to the implementation of the biological dephosphatation, and the local economic conditions and their impact firstly on the supply cost of metal salt and secondly on the cost of removal of the sludge.

The prior art also discloses plants combining the treatment of nitrogen and phosphorus in the same course, in the case where the amount of water treated requires these simultaneous treatments. The treatment techniques reviewed above will then be combined in this same course.

FIGS. 5 to 8b illustrate the combinations of these treatments that may be used in a single course for the simultaneous removal of nitrogen and phosphorus.

Figure 5:
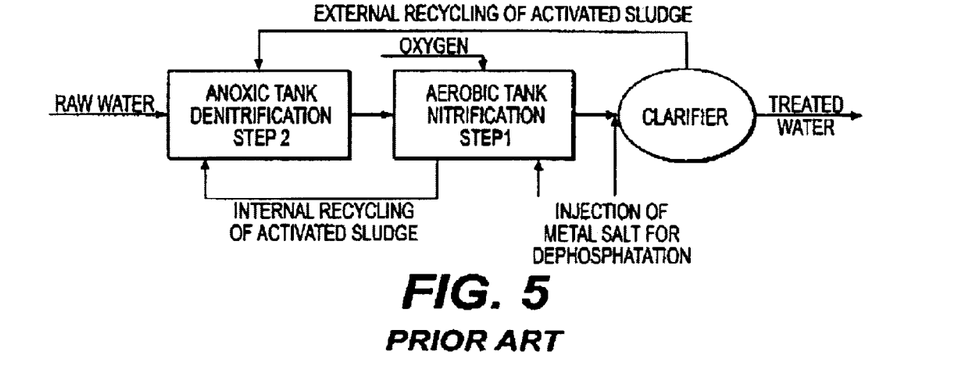

FIG. 5 illustrates a plant for treating nitrogen in two tanks with physicochemical dephosphatation.

Figure 6:
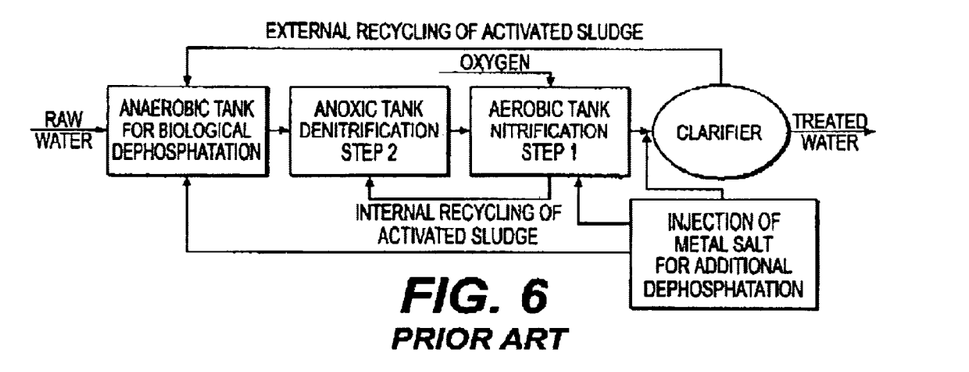

FIG. 6 represents a plant for treating nitrogen in two tanks with biological dephosphatation and complementary physicochemical dephosphatation.

Figure 7A:
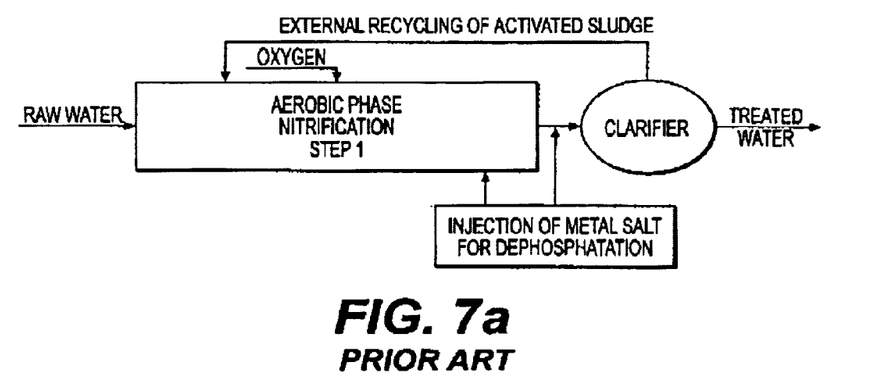
Figure 7B:
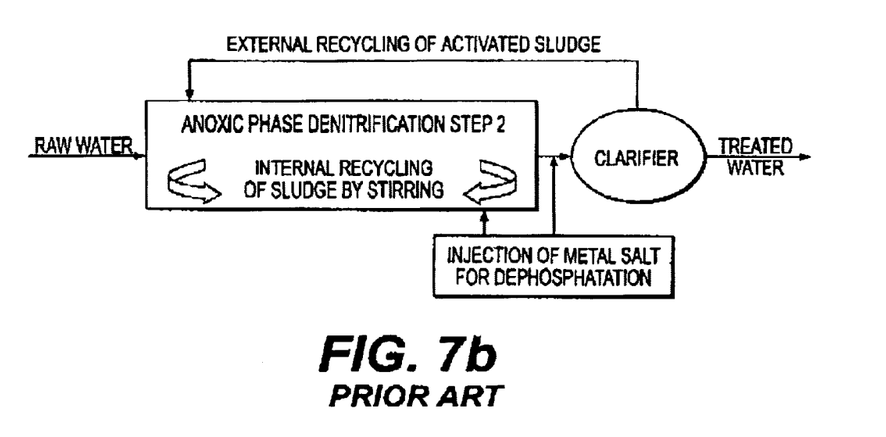
Figure 8A:
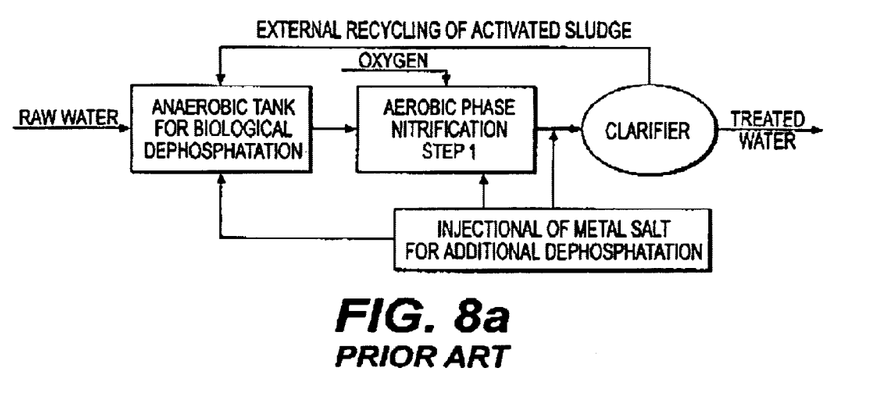
Figure 8B:
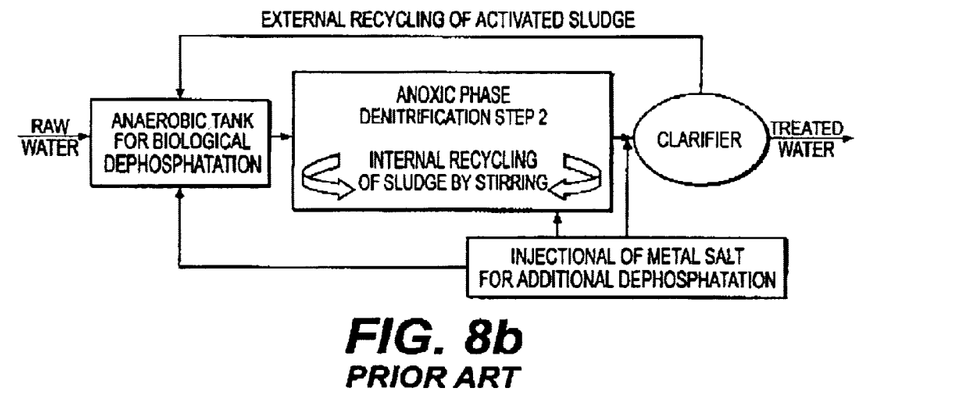

FIGS. 7a and 7b show the two operating phases of a one-tank nitrogen treatment plant with physicochemical dephosphatation, and FIGS. 8a and 8b show the two operating phases of a one-tank nitrogen treatment plant with biological dephosphatation and additional physicochemical dephosphatation.

BRIEF DESCRIPTION OF THE INVENTION

On the basis of this prior art, the present invention proposes to provide a process for purifying wastewater that simultaneously removes nitrogen and phosphorus, this process being performed in purification plants or stations that are subject to large periodic variations in pollutant loads to be treated, as described previously, the technical problem solved by the invention being that of varying in the same operations the nitrogen and phosphorus treatment techniques, depending on the pollutant load situations received by the purification plant. It is thus possible to exploit the economic advantages of each treatment technique and to optimize the investment and running costs.

Consequently, this invention relates to a process for purifying wastewater in order to treat the nitrogen and phosphorus contained in this effluent, this process being performed in a plant comprising an anaerobic tank, a second tank equipped with aeration means possibly being brought into service to operate aerobically, or taken out of service for an anoxic operation, a clarifier and means for injecting metal salts into the second tank, this process also being characterized in that it comprises the following steps:

a) rating the tanks and the aeration means on the basis of the lowest pollution load, referred to as the low load, which corresponds to the plant load during dry weather;

b) running the plant during dry weather, or at low load, according to the nitrogen treatment method in a tank with biological dephosphatation;

c) running the plant during wet weather, or at high load, by performing the physicochemical phosphorus treatment technique and the nitrogen treatment technique in two tanks, and d) controlling the plant by detecting the load situation it is in (high load or low load) and to adapt the operating configuration of the tanks to the actual load situation.

According to the invention, during step b) above, the first tank operates anaerobically so as to perform the biological dephosphatation and the second tank operates alternately aerobically, to perform the nitrification, and then anoxically, to perform the denitrification, with internal recycling of the sludge by stirring.

According to the invention, during step c) above, the first tank is converted into an anoxic tank so as to perform the denitrification and the second tank operates aerobically to perform the nitrification, the physicochemical dephosphatation being obtained by supplying metal salts.

According to the present invention, the plant is controlled by means of a system comprising a programmable robot, a nitrate analyser, probes for measuring the redox potential and a probe for measuring dissolved oxygen, and it is characterized in that the regulation is performed on the basis of continuous measurement of the residual nitrates:

during low load, the first tank, operating anaerobically to perform the biological treatment of the phosphorus;

the change in configuration being carried out only when the nitrogen load requires it (during a period of high load):

the nitrification is performed in the second tank operating aerobically, the denitrification being monitored by one of the probes for measuring the redox potential;

the denitrification is monitored by means of the continuous nitrate analyser in the second tank;

the change in the operating configuration of the first tank from anaerobic mode to anoxic mode and vice versa is controlled from the nitrate analyser.

BRIEF DESCRIPTION OF THE FIGURES

Other characteristics and advantages of the present invention will emerge from the description given below with reference to the attached drawings, which illustrate implementation examples that are free of any limiting nature. In the drawings:

FIGS. 1 to 8b are diagrams relating to the prior art discussed above;

DETAILED DESCRIPTION OF THE INVENTION

In the embodiment described herein, the plant is a purification plant that needs to withstand large variations in pollutant loads to be treated between the dry-weather situation (low load) and the wet-weather situation (high load), on the basis of the hypothesis:

wet-weather load=1.5 times the dry-weather load.

As has already been mentioned above, the process according to the invention consists in rating the plant, i.e. the purification station, on the basis of the lowest pollution load (low load) while at the same time implementing the one-tank nitrogen treatment technique with biological dephosphatation, and in converting the course of treatment during high load so as to treat the nitrogen in two tanks and to perform a physicochemical phosphorus treatment.

A) Operation During Low Load

Figure 9A:
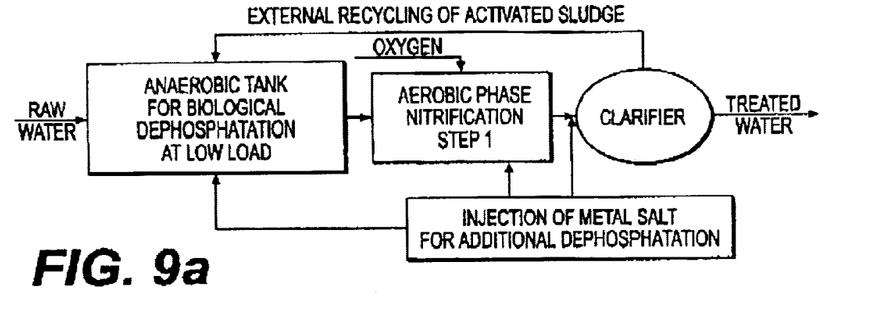
FIGS. 9a and 9b are diagrams illustrating the operating mode of a plant using the invention during dry weather or low load.
Figure 9B:
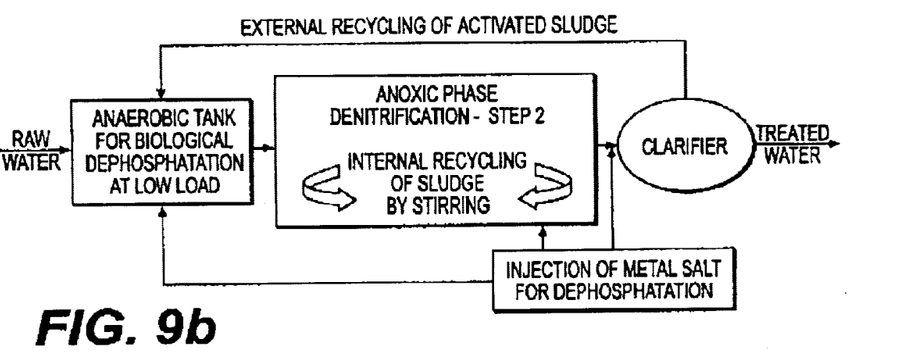

Reference is made firstly to FIGS. 9a and 9b, which illustrate the principle of this operation during low load. During this period of operation, the first tank operates anaerobically to perform the biological dephosphatation and the second tank operates alternately aerobically (to perform the nitrification) and anoxically (to perform the denitrification) with internal recycling of the sludge. A complementary dephosphatation is also provided for, by injecting metal salts as explained previously.

The advantages of this configuration are the following:

optimized investment for nitrogen treatment works (lower than with the two-tank technique);

rating of the hourly aeration power on the basis of 1/12 of the daily "low load" needs, thus higher than with the two-tank technique (1/20 of the daily needs);

optimization of the consumption of metal salts (i.e. less than 50% of the amount required using the physicochemical dephosphatation technique), and minimization of the production of dephosphatation sludge (i.e. 50 to 60% of the amount produced with the physicochemical dephosphatation technique).

Thus, this operating configuration makes it possible to optimize the start-up investment costs for purification plant works and to minimize the running costs relating to the dephosphatation throughout the low-load period.

B) Running During High Load

In a situation of high load, the techniques used for treating nitrogen and phosphorus change, which is possible by modifying the function of several works in the course of treatment.

Specifically, it has been observed that during high load, the efficacy of the anaerobic tank (first tank) for carrying out the biological phosphorus treatment decreases substantially because the conditions required are no longer met, and especially:

the residence time becomes insufficient on account of the increase in flow rate accompanying the increase in the pollutant load, and true anaerobic conditions are no longer entirely present on account of an introduction of oxygen with the rainwater.

Since the biological removal of the phosphorus by overassimilation no longer has the same efficacy, the overall removal efficiency is obtained by increasing the amounts of metal salts injected. The course of treatment in the configuration of the physicochemical phosphorus treatment technique is thus transformed.

Since the anaerobic tank (first tank) is no longer useful for the biological phosphorus treatment, it can then be used as an anoxic tank by starting up the internal recycling of the activated sludge, which allows it to carry out the two-tank nitrogen treatment technique (anaerobic tank: denitrification, and aerobic tank: nitrification). This change in technique makes it possible to treat the additional pollution load (for example wet-weather load =1.5 times the dry-weather load) without changing the rating of the aeration equipment.

Specifically, in the treatment of nitrogen according to the one-tank technique, the hourly aeration power is 1/12 of the daily low-load needs. In the two-tank nitrogen treatment technique, the hourly aeration power is 1/20 of the daily high-load needs. The ratio between 1/20 and 1/12 corresponds to a power increase of 66%, which, in the case of the chosen example, makes it possible to deal with a 50% increase in pollutant load to be treated.

Figure 10:
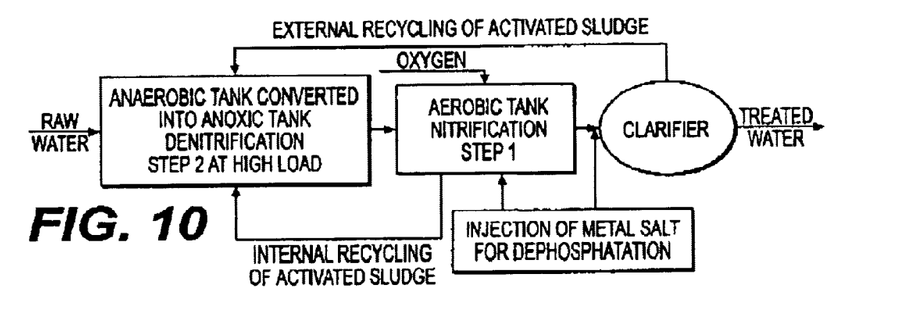
FIG. 10 is a diagram similar to FIGS. 9a and 9b, illustrating the operating mode during wet weather or high load.

The principle of operating during high load used according to the invention is illustrated by FIG. 10:

the anaerobic tank is converted into an anoxic tank for the treatment of nitrogen, and the amount of metal salts injected for the physicochemical phosphorus treatment is increased, so as to compensate for the decrease in the biological over-assimilation of phosphorus.

The characteristics of this configuration are as follows:

no over-investment for treating nitrogen in two tanks, given that the existing anaerobic tank is used, by simply changing its function;

no overconsumption of the amount of metal salts used for the phosphorus treatment, compared with a biological treatment solution, given that the change in load would in any case have reduced the efficacy of the over-assimilation and consequently have required additional metal salts to compensate;

no overproduction of dephosphatation sludge compared with a biological treatment solution;

optimization of the rating of the aeration capacity, given that a simple change in configuration makes it possible to treat an additional 50% of nitrogen load without, however, increasing the aeration capacity.

The process also includes an automatic control making it possible firstly to detect the load situation (high or low) prevailing in the purification plant, and secondly to adapt the operating configuration of the plant to the load situation detected as described above.

The control system that can be used to carry out the process of the invention comprises an industrial programmable robot, a nitrate analyser, two probes for measuring the redox potential and a probe for measuring dissolved oxygen. Its operating principle is as follows:

1) during low load (FIGS. 9a and 9b), the first tank or an anaerobic tank performs the biological treatment of phosphorus, with absence of recycling of the activated sludge, and the second tank operates alternately in aerobic phase (with supply of oxygen: FIG. 9a) and in anoxic phase (FIG. 9b) by cutting the supply of oxygen and internal recycling of the sludge by stirring, so as to perform thorough denitrification.

2) during high load corresponding to an increase in the nitrogen pollution, continuous thorough nitrification in the aerobic tank is favoured (FIG. 10), this nitrification being monitored by a probe for measuring the redox potential. The denitrification efficiency is continuously evaluated by the continuous nitrate analyser in the second tank.

The change in operating configuration of the anaerobic tank to an anoxic tank, and vice versa, is controlled by means of the nitrate analyser according to the following principle:

a nominal "high threshold" value of residual nitrates indicating the need for additional denitrification switches on the internal recycling of the activated sludge, thus converting the anaerobic tank into an anoxic tank;

a nominal "low threshold" value of residual nitrates, indicating that the denitrification in the aerobic tank is complete, switches off the internal recycling of the activated sludge, thus returning the anoxic tank to the anaerobic configuration. This change in operating mode may be confirmed by a probe for measuring the redox potential, indicating that the anoxic tank has returned to the anaerobic configuration.

Threshold values for controlling the analysers are given hereinbelow, by way of example:

redox probe in the aerobic tank to monitor the nitrification conditions:
high threshold: 380 to 550 mV/EHN
low threshold: 100 to 300 mV/EHN continuous nitrate analyser:
high threshold: 2 to 10 mg/l
low threshold: 0 to 2 mg/l redox probe in the first tank for monitoring whether it has returned to an anaerobic configuration:
this return takes place for redox potential values of less than 0 to −200 mV/EHN oxygen probe in the aerobic tank: operates as a backup to the redox probe:

high threshold: 1 to 6 mg/l low threshold: 0 to 1 mg/l+delay ensuring a minimal duration at 0 mg/l (anoxia).

According to one implementation example of the present invention, the change in configuration on the nominal "low threshold" value of nitrates will be allowed after at least two nitrification-denitrification cycles with residual nitrate contents that are less than the nominal value.

According to the invention, the additional physicochemical phosphorus treatment is performed by means of a pre-programmed automatic adaptation of the metering of metal chloride according to the operating mode of the biological stage.

The process that is the subject of the invention especially provides the following advantages:

it makes it possible to rate the plant on the basis of the low nitrogen load situation, with the most economical configuration (one-tank nitrogen treatment with biological dephosphatation). Specifically, it has been seen above that such an operating configuration makes it possible both to optimize the investment cost of the plant works and to minimize the running costs relating to the dephosphatation throughout the low-load period;

it makes it possible to treat an additional nitrogen load (extra 50% in the example chosen herein) solely by virtue of changing the operating configuration, and without it being necessary to make provision for overrating of the aeration means in the purification plant design. Specifically, if the plant had been rated on the basis of the high nitrogen load situation, with the "one-tank nitrogen treatment with biological dephosphatation" configuration, in order to exploit the advantages of this solution (during high load), especially as regards the running costs, it would have been necessary to rate the power of the aeration means on the basis of $\frac{1}{12}$ of the high load (instead of $\frac{1}{12}$ of the low load in the process of the invention), which would represent an unused overinvestment throughout the period for which the purification plant is at low load, and the fact of basing the control of the plant on a continuous measurement of residual nitrates ensures that the change in operating configuration during high load is performed only if the nitrogen load received requires it. Consequently, the purification plant can remain in the low-load configuration during standard running, thus making it possible continuously to optimize the running costs.

Needless to say, the fact remains that the present invention is not limited to the implementation examples described or represented herein, but rather encompasses all the variants.

What is claimed is:

1. Process for purifying wastewater effluent in order to treat the nitrogen and phosphorus contained in this effluent, this process being performed in a plant comprising an anaerobic tank, a second tank equipped with aeration means selectively being brought into service to operate aerobically, or taken out of service for an anoxic operation, a clarifier and means for injecting metal salts into the second tank, this process comprising the following steps:

a) rating the tanks and the aeration means on the basis of the lowest pollution load, referred to as the low load, which corresponds to the plant load during dry weather;

b) running the plant during dry weather, or at low load, according to a nitrogen treatment in a tank with biological dephosphatation;

c) running the plant during wet weather, or at high load, by performing the phosphorus treatment and the nitrogen treatment in two tanks, and d) controlling the plant by detecting whether the load is in high load or low load and to adapt the operating configuration of the tanks to the actual load.

2. Process according to claim 1, wherein, during step b), the first tank operates anaerobically so as to perform the biological dephosphatation and the second tank operates alternately aerobically, to perform the nitrification, and then anoxically, to perform the denitrification, with internal recycling of the sludge by stirring.

3. Process according to claim 2, wherein an additional physicochemical phosphorus treatment is performed by means of a pre-programmed automatic adaptation of the metering of metal chloride according to the operating mode of the biological stage.

4. Process according to claim 1, wherein, during step c), the first tank is converted into an anoxic tank so as to perform the denitrification and the second tank operates aerobically to perform the nitrification, the physicochemical dephosphatation being obtained by supplying metal salts.

5. Process according to claim 4, wherein an additional physicochemical phosphorus treatment is performed by means of a pre-programmed automatic adaptation of the metering of metal chloride according to the operating mode of the biological stage.

6. Process according to claim 1, wherein the plant is controlled by means of a system comprising a programmable robot, a nitrate analyzer, probes for measuring the redox potential and a probe for measuring dissolved oxygen, and further wherein the regulation is performed on the basis of continuous measurement of the residual nitrates:

during low load, the first tank, operating anaerobically to perform the biological treatment of the phosphorus;

the change in configuration being carried out only when the nitrogen load requires it during a period of high load:

the nitrification is performed in the second tank operating aerobically, the denitrification being monitored by one of the probes for measuring the redox potential;

the denitrification is monitored by means of the continuous nitrate analyzer in the second tank;

the change in the operating configuration of the first tank from anaerobic mode to anoxic mode and vice versa is controlled by means of the continuous analysis of the residual nitrate content in the aeration tank.

7. Process according to claim 6, wherein an additional physicochemical phosphorus treatment is performed by means of a pre-programmed automatic adaptation of the metering of metal chloride according to the operating mode of the biological stage.

8. Process according to claim 6, the control of the change in configuration by means of the continuous analysis of the nitrates in the aeration tank is performed by means of two nominal values:

a nominal "high threshold" value of residual nitrates indicating the need for additional denitrification switches on the internal recycling of the activated sludge, thus converting the anaerobic tank into an anoxic tank;

a nominal "low threshold" value of residual nitrates, indicating that the denitrification in the aerobic tank is complete, switches off the internal recycling of the activated sludge, thus returning the anoxic tank to the anaerobic configuration.

9. Process according to claim 8, wherein an additional physicochemical phosphorus treatment is performed by means of a pre-programmed automatic adaptation of the metering of metal chloride according to the operating mode of the biological stage.

10. Process according to claim 8, wherein the change in configuration on the nominal "low threshold" value of nitrates is allowed after at least two nitrification-denitrification cycles with residual nitrate contents that are less than the nominal value.

11. Process according to claim 10, wherein an additional physicochemical phosphorus treatment is performed by means of a pre-programmed automatic adaptation of the metering of metal chloride according to the operating mode of the biological stage.

12. Process according to claim 8, wherein the change in operating mode may be confirmed by means of a probe for measuring the redox potential indicating that the anoxic tank has returned to an anaerobic configuration.

13. Process according to claim 12, wherein an additional physicochemical phosphorus treatment is performed by means of a pre-programmed automatic adaptation of the metering of metal chloride according to the operating mode of the biological stage.

14. Process according to claim 1, wherein an additional physicochemical phosphorus treatment is performed by means of a pre-programmed automatic adaptation of the metering of metal chloride according to the operating mode of the biological stage.

* * * * *